(12) United States Patent
Starken

(10) Patent No.: US 6,675,673 B2
(45) Date of Patent: Jan. 13, 2004

(54) LOCKING DEVICE

(75) Inventor: Harald Starken, Walkertshofen (DE)

(73) Assignee: Valeo Sicherheitssysteme GmbH, Erdweg (DE)

( * ) Notice: Subject to any disclaimer, the term of this patent is extended or adjusted under 35 U.S.C. 154(b) by 39 days.

(21) Appl. No.: 10/050,761

(22) Filed: Jan. 18, 2002

(65) Prior Publication Data

US 2002/0108412 A1 Aug. 15, 2002

(30) Foreign Application Priority Data

Jan. 24, 2001  (DE) ......................................... 101 03 182

(51) Int. Cl.⁷ ................................................. G05G 5/06
(52) U.S. Cl. .......................................... 74/527; 70/186
(58) Field of Search ........................ 74/527, 532, 530; 70/182, 183, 184, 185, 186, 252; 180/287

(56) References Cited

U.S. PATENT DOCUMENTS

| | | | | |
|---|---|---|---|---|
| 5,566,587 A | * | 10/1996 | Sogo et al. | 74/526 |
| 5,896,765 A | * | 4/1999 | Peyre et al. | 70/186 |
| 6,295,848 B1 | * | 10/2001 | Suzuki | 70/186 |
| 6,439,011 B1 | * | 8/2002 | Frick et al. | 70/185 |
| 6,543,262 B2 | * | 4/2003 | Limburg et al. | 70/186 |
| 2001/0025516 A1 | * | 10/2001 | Starken | 70/186 |

FOREIGN PATENT DOCUMENTS

| | | |
|---|---|---|
| DE | 0 764 566 | 3/1997 |
| DE | 199 06 268 A1 | 9/2000 |
| DE | 199 61 975 C1 | 12/2000 |
| DE | 199 29 435 A1 | 1/2001 |

* cited by examiner

Primary Examiner—Jack Lavinder
Assistant Examiner—Bradley King
(74) Attorney, Agent, or Firm—Liniak, Berenato, Longacre & White

(57) ABSTRACT

A compactly constructed locking device with a displaceable securing element fixing a detent element and actuated in a simple way into a detaining position or into a releasing position. The distance between a control cam and the securing element is selected in such a way that, with the detent element in the unlocking position, the control cam is axially displaced with respect to the control contour and is therefore located outside the range of action of the control contour. Only when the electromechanical drive is activated in order to displace the detent element into its locking position does the drive part with the control contour come into engagement with the control cam. The arrangement allows for sudden displacement into the locking position.

11 Claims, 4 Drawing Sheets

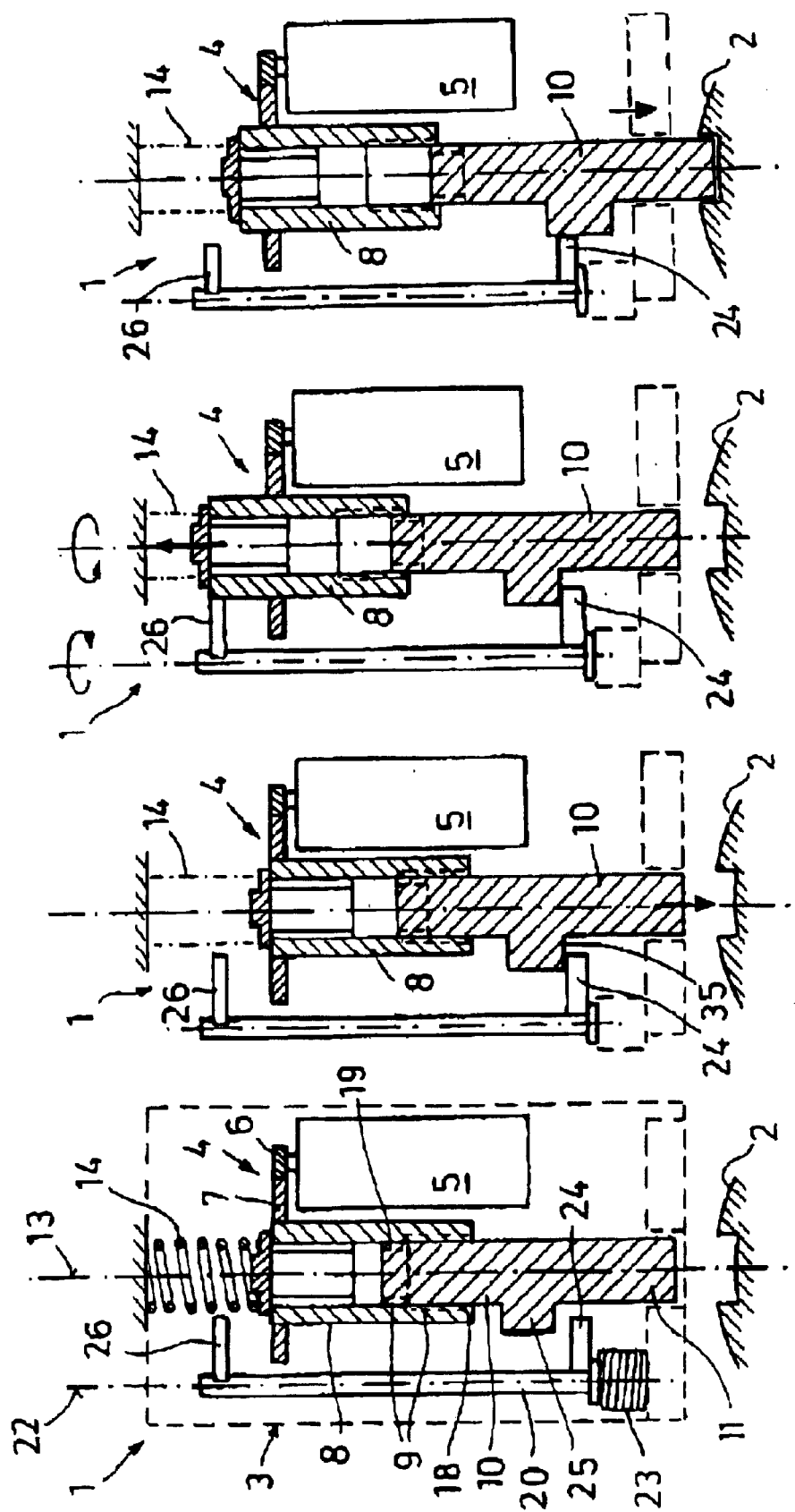

Figure 5:
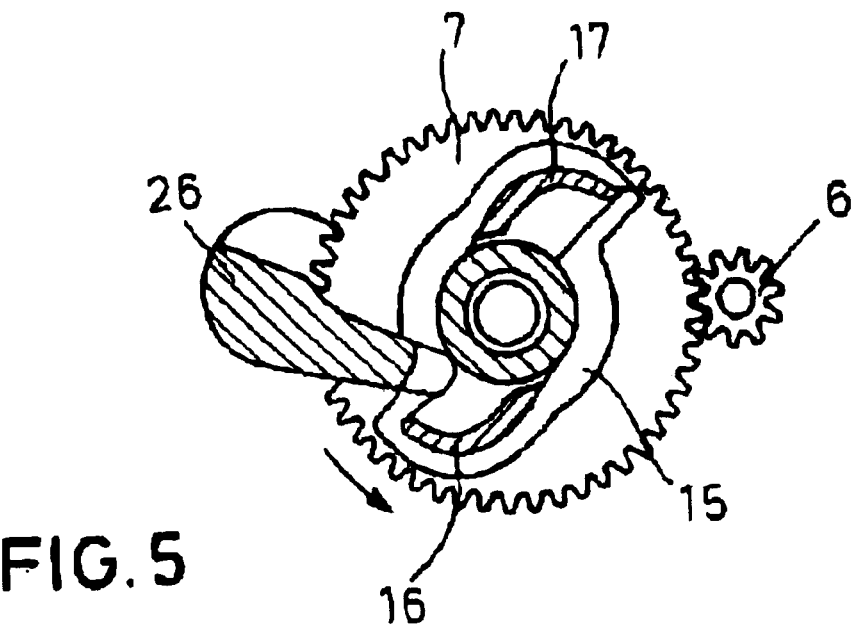

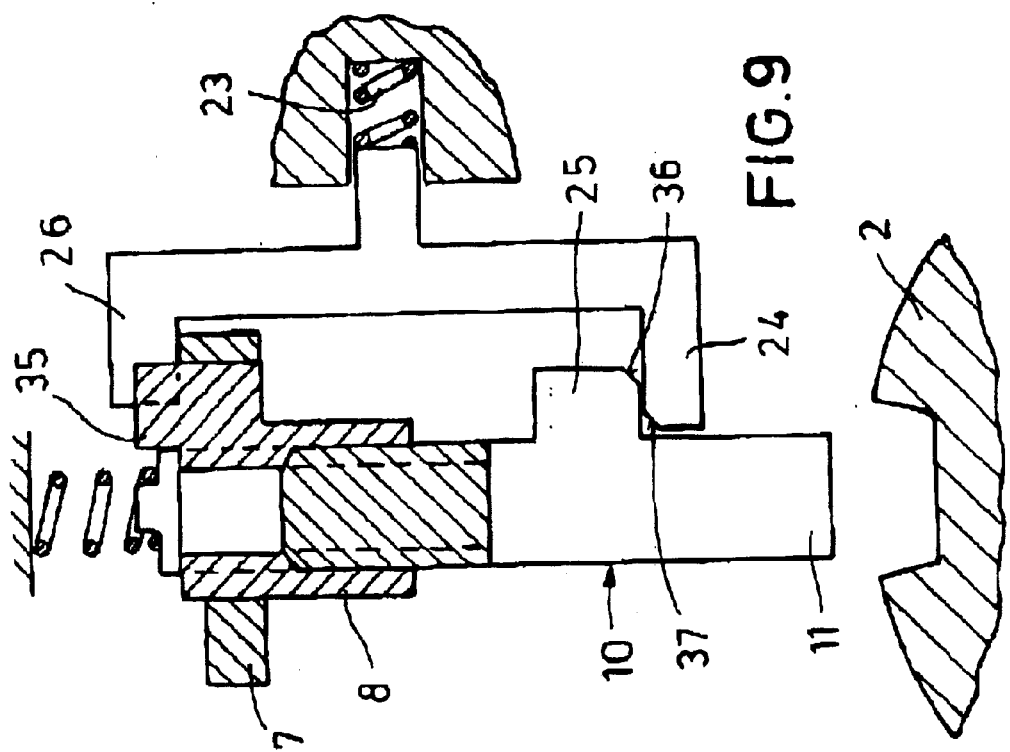
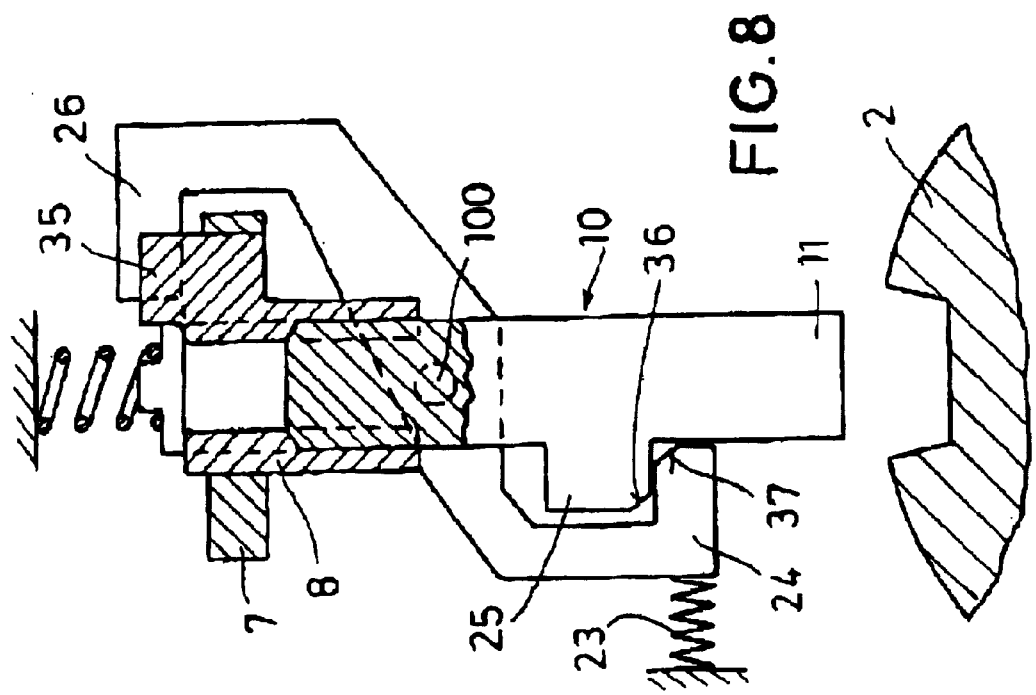

LOCKING DEVICE

The invention relates to a locking device with a detent element axially displaceable by means of an electromechanical drive from an unlocking position into a locking position, and vice versa.

Locking devices of this type are known and are used, above all, for the electric locking of the steering spindle of a steering apparatus of a motor vehicle. Thus, for example, EP 0 764 566 A1 discloses a locking device which comprises an electric motor arranged in a housing, with a following spindle drive for displacing a detent element from its locking position into its unlocking position, and vice versa, the detent element, in its locking position, engaging into the recess, formed by adjacent teeth, of a toothed ring fastened to the steering spindle and consequently blocking the steering spindle.

One disadvantage of this known device, inter alia, is that, in the event of a mechanical defect in the drive train (for example, if the spindle is broken off, etc.) or in the event of pronounced vibrations of the locking device, the situation where the detent element is displaced into its locking position, even during travel, is not ruled out.

German patent application DE 199 06 268 A1 already discloses a locking device, in which the detent element is provided laterally with a recess, into which, for fixing it in the unlocking position, a securing element designed as a lever is pivoted by means of a prestressed spring. In this case, the securing element is pivotable about an axis arranged parallel to the longitudinal axis of the spindle drive. For the securing element to be pivoted out, there is a shaft activated by the drive part of the threaded spindle via a control cam. In practice, however, the use of a securing element of this type activated by the threaded spindle presents problems when the drive is a drive without limit stops (drive with freewheel), such as is known, for example, from DE 199 61 975 C1, because, in this case, the control contour, together with the drive part, is displaced in terms of its axial position.

The object in which the invention is based is to specify a compactly constructed locking device with a securing element which is pivotable or displaceable for fixing the detent element and which can be actuated in a simple way into its detaining position or into its releasing position even when the drive used for displacing the detent element is a drive with freewheel.

This object is achieved, according to the invention, by means of the features of claim 1. Further particularly advantageous refinements of the invention are disclosed in the subclaims.

The invention is based essentially on the notion, on the one hand, of providing a control contour on the axially displaceable drive part, but, on the other hand, of selecting the distance between the control cam and the securing element in such a way that, with the detent element in the unlocking position, the control cam is displaced axially in relation to the control contour and is consequently located outside the range of action of the control contour. When the electromechanical drive is activated in order to displace the detent element into its locking position, the securing element initially remains in its detaining position. The detent element or the driver is thereby supported on the securing element, and the drive part together with the control contour is displaced axially, counter to the pressure of a compression spring, in the direction of the control cam, until the control cam comes into engagement with the control contour. By means of the control contour then acting on the control cam, the cam and consequently also the securing element are actuated, and the detent element or the driver is released, so that the prestressed spring abruptly displaces into the locking position the arrangement consisting of the drive part, driver and detent element.

Insofar (when a freewheel is used) the securing element changes its position only when the arrangement consisting of the drive part, driver and detent element is moved completely in the locking and unlocking directions, a detection of both end positions of the arrangement can be carried out by means of only one sensor by the position of the securing element being interrogated.

The control contour may have a ramp-shaped design in the axial direction, in such a way that, as a result of the axial displacement of the drive part, the control cam executes its pivoting movement necessary for releasing the securing element. However, as a rule, this presupposes a relatively large axial stroke movement of the drive part. In order to keep this stroke movement smaller, it has proved advantageous to design the control contour of the drive part in such a way that, during the upwardly directed displacement of the drive part, the control cam is supported on a helical outwardly directed contact surface on the control contour.

The securing element may be designed both as a pivotable lever and as a linearly guided bolt, the connection between the respective securing element and the control cam being capable of being made in various ways.

Figure 6:
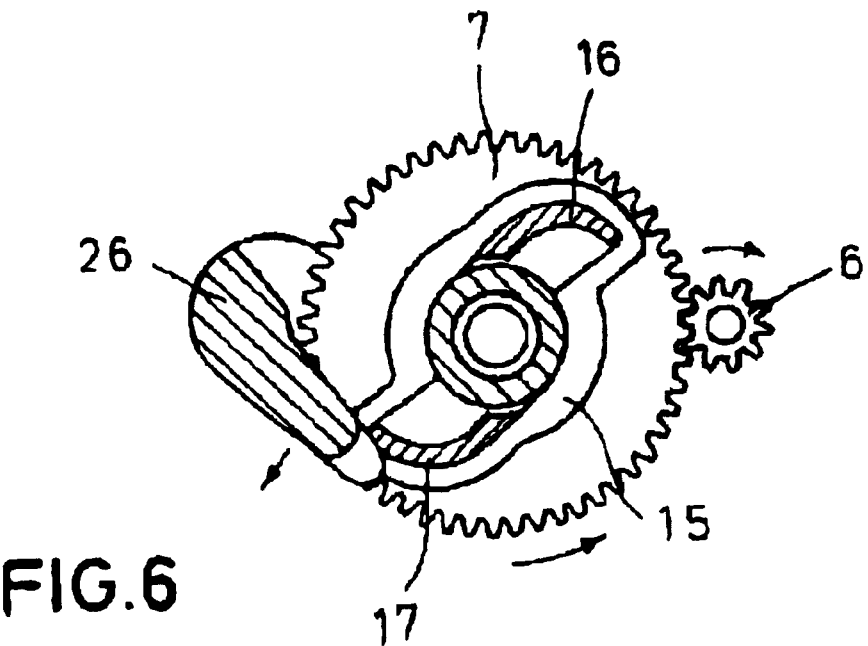
Figure 7:
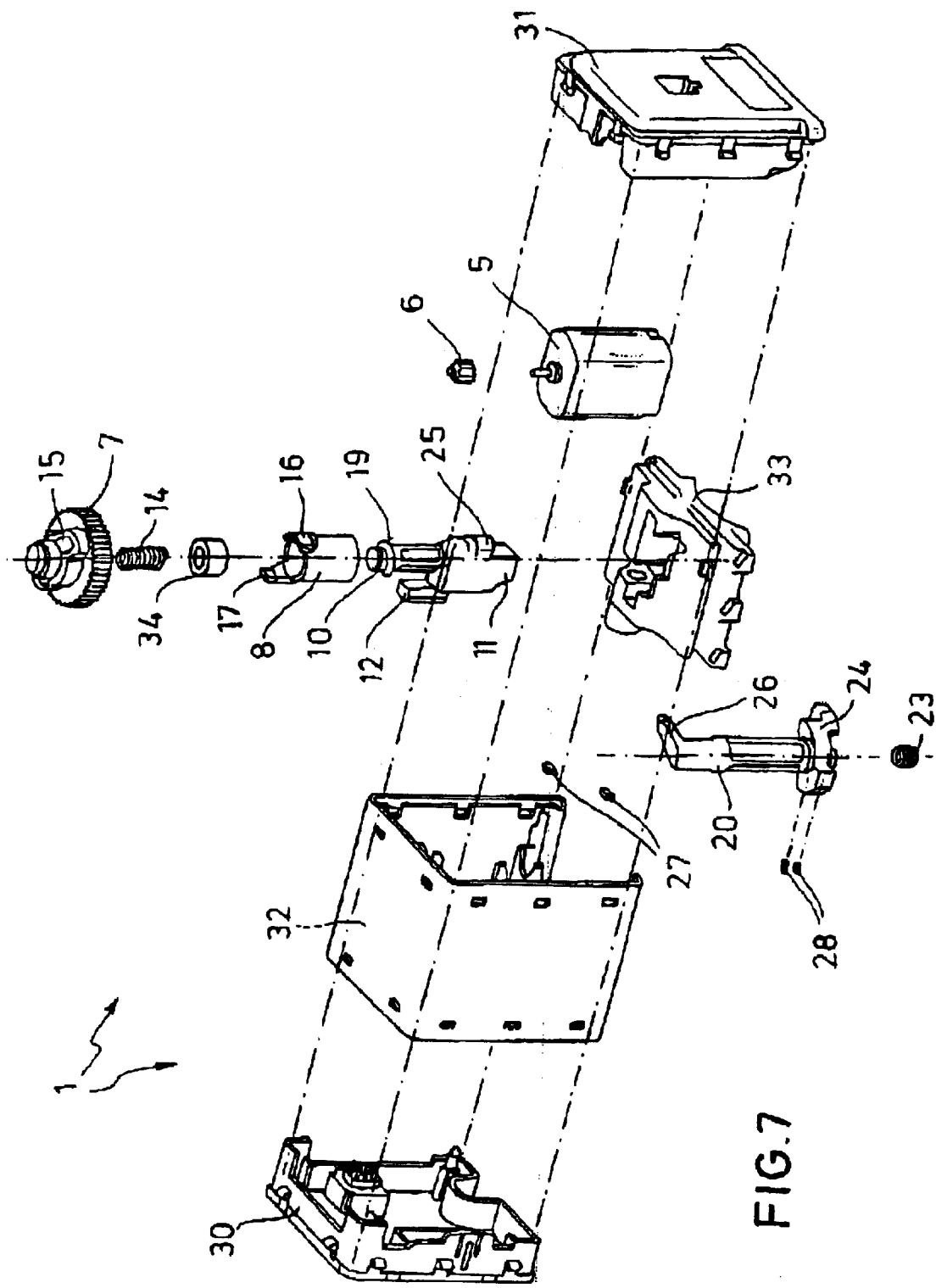

Further details and advantages of the invention may be gathered from the following exemplary embodiments explained with reference to figures of which:

FIGS. 1–4 show four diagrammatic illustrations to explain the mode of operation of the locking device according to the invention;

FIGS. 5 and 6 show enlarged top views of the views of the locking device which are illustrated in FIGS. 1 and 3, the spring designated by 14 in FIGS. 1 and 3 having been omitted for the sake of clarity;

FIG. 7 shows an exploded illustration of a locking device according to the invention, and FIGS. 8 and 9 show two further exemplary embodiments of the invention with different arrangements of the securing elements.

In FIGS. 1–4, 1 designates a locking device for the electrical locking of a steering spindle (not illustrated) of a motor vehicle and 2 designates a toothed ring connected fixedly in terms of rotation to the steering spindle.

The locking device 1 comprises a housing 3, merely indicated by broken lines in FIG. 1, in which an electromechanical drive 4 with an electric motor 5 of reversible direction of rotation is arranged. The electric motor 5 acts via a pinion 6 with a following gearwheel 7 on a sleeve-shaped drive part 8 which is itself connected to a driver 10 via a threaded drive 9. That end region of the driver 10 which faces away from the drive part 8 is designed as a detent element 11. The driver 10 is guided axially in a guide 12 fixed relative to the housing (FIG. 7), so that the driver 10 cannot rotate about its longitudinal axis 13.

The drive part 8 is arranged so as to be axially displaceable counter to the pressure of a compression spring 14 supported on the housing 3 and is led through a recess 15 of the gearwheel 7 (fixed, in terms of its axial position, relative to the housing) (FIG. 5). The recess 15 possesses an edge contour, into which a corresponding contour, forming two blade-shaped segments 16, 17, of the corresponding part region of the drive part 8 engages positively, so that the drive part 8 is connected fixedly in terms of rotation to the gearwheel 7.

The threaded drive 9, consisting of an internal thread 18 of the drive part 8 and of a threaded segment 19 of the driver, is designed as a freewheel, and it has proved advantageous if the control pin, described in the publication DE 199 61 975 C1 mentioned in the introduction, is replaced by a fixed threaded segment 19, so that the control contours otherwise necessary on the thread ends of the drive part may be dispensed with. In this case, the distance which the driver 10 or the drive part 8 must cover is minimized by reduced thread pitch (for example, 1.5 mm, as compared with 6 mm in the main thread of the drive part) of the last turn in each case. The corresponding geometry of the fixed threaded segment on the driver 10 is obtained preferably by the threads being cut with the different pitches, so that there is surface contact in both threaded regions. The contour of this threaded segment is therefore made diamond-shaped.

The locking device 1 comprises, furthermore, a lever-shaped securing element (securing lever) 24 which is arranged fixedly in terms of rotation on a shaft 20 and is pivotable about an axis 22 parallel to the longitudinal axis 13 of the driver 10 and which is prestressed by a torsion spring 23 and, to secure the detent element 11 in the unlocking position (FIG. 1), is pressed by the torsion spring 23 under a projection 25 of the driver 10. Also fastened to the shaft 20 is a control cam 26 which is at a distance from the securing element 24 selected in such a way that, with the detent element 11 in the unlocking position, the control cam 26 is located above the control contour formed on the drive part 8 by the blade-shaped segments 16, 17.

The mode of operation of the invention is dealt with in more detail below. Thus, the detent element 11 will first be located in the unlocking position, illustrated in FIGS. 1 and 5, in which the securing lever 24 is in its securing position and blocks an axial movement of the driver 10 in the direction of the toothed ring 2.

When the electromechanical drive 4 is activated in order to displace the detent element 11 into its locking position, the drive part 8 is rotated via the gearwheel 7, and the threaded segment 19 of the driver 10 passes into the internal thread 18 of the drive part 8, so that the driver 10 is displaced in the direction of the toothed ring 2, until the projection 25 of the driver 10 butts against the securing lever 24 (FIG. 2).

Since further displacement of the driver 10 and consequently also the detent element 11 is not possible, during the further rotation of the drive part 8 the latter is displaced upward counter to the pressure of the compression spring 14, until the threaded segment 19 has reached the end of the internal thread 18 of the drive part 8 and the control cam 26 engages into the control contour formed by the segments 16, 17 (FIGS. 3 and 6). By means of the outwardly running blade-shaped control contour 16, 17 of the drive part 8, the control cam 26 and, via the shaft 20, also the securing lever 24 are pivoted into their releasing position, so that the drive part 8, together with the driver 10 and with the detent element 11, are displaced axially into the locking position by the compression spring 14 (FIG. 4). The electric motor 5 is simultaneously switched off via a first sensor detecting the position of the securing lever 24.

To displace the detent element 11 into its unlocking position, the electromechanical drive 4 is again activated. In this case, the direction of rotation of the electric motor 5 changes. The threaded segment 19 of the driver 10 again passes into the internal thread 18 of the drive part 8, and the driver 10 is displaced upward, until the securing lever 24 is pivoted under the projection 25 by virtue of the prestressed torsion spring 23 and the electric motor 5 is switched off with the aid of the second sensor detecting the position of the securing lever 24 (FIG. 1).

The detection of the respective position of the securing lever 24 may be carried out, for example, with the aid of magnetic-field sensors (Hall sensors) 27 (FIG. 7), corresponding magnets 28 being arranged on the securing lever 24.

FIG. 7 reproduces an exploded illustration of a locking device 1' according to the invention, the same functional elements as in the exemplary embodiment described above being given the same reference symbols. The housing 3 consists of the side parts 30, 31, of the cover 32 and of the lower part 33. A thrust plate 34, on which the compression spring 14 is supported, can be inserted into the drive part 8. In this case, however, this compression spring 14 is not supported fixedly relative to the housing directly on the cover 32, but on the gearwheel 7 which, in terms of its axial position, is likewise arranged fixedly relative to the housing.

The invention, of course, is not restricted to the exemplary embodiments described above. Thus, for example, the driver and the detent element do not need to be of one-part design, but, instead, the driver may be provided with a receptacle, into which the detent element engages with its one end, such as is disclosed, for example, in DE 199 06 268 A1. The threaded drive does not necessarily have to be a freewheel drive, insofar as the end positions of the detent element, etc. are determined by corresponding sensors which then, in turn, cause the electric motor to be switched off.

Moreover, the driver or the detent element may be provided with a groove-shaped recess for engaging behind the detent lever, instead of with a projection.

Furthermore, the control contour of the drive part may also be, for example, of ramp-shaped design in the axial direction, so that the control cam executes its pivoting movement, necessary for releasing the securing lever, solely as a result of the axial displacement of the drive part. The control contour in the circumferential direction does not necessarily have to be of blade-shaped design, but may have another contour moving the control cam outwards.

Moreover, it is also not absolutely necessary for the control cam to engage into the control contour above the gearwheel in order to release the driver. Instead, the position of the control cam and that of the control contour may also be selected in such a way that the control cam is supported on the control contour in a region below the gearwheel.

Finally, instead of the securing element and the control cam being fastened to a shaft which is pivotable about an axis parallel to the longitudinal axis of the driver, another pivotable arrangement of the securing element and control cam may also be provided. Furthermore, the securing element may also be designed as a radially displaceable bolt. FIGS. 8 and 9 illustrate corresponding exemplary embodiments, again the same functional elements as in the exemplary embodiments described above being given the same reference symbols. In both figures, the control cam 26 is displaced axially until it has just reached the control contour of the drive part 8.

FIG. 8 reproduces an exemplary embodiment in which the securing lever 24 and the control cam 26 are arranged in each case at the ends of a two-armed lever which is pivotable about an axis 100 lying, for example, in the lever center. When the drive part 8 rotates further after the control cam has reached the control contour, the control cam 26 is guided outward by virtue of the control contour, designated by 35, of the drive part 8, so that the securing element 24 is also moved radially outward counter to the pressure of the spring 23. By the choice of lengths of the two lever arms, the deflection of the control cam 26 achieved by the control contour 35 of the drive part 8 can be adapted to the deflection of the securing element 24 necessary for releasing the driver 10.

FIG. 9 shows an exemplary embodiment in which, as a result of the outward movement of the control cam 26, the securing element 24 is also pressed radially outward counter to the pressure of the spring 23 (for example, in a linear guide).

In the exemplary embodiments illustrated in FIGS. 8 and 9, the mutually confronting contact surfaces of the securing element 24 and of the projection 25 on the driver 10 have oblique surfaces 36, 37 in the front region in each case, in order to increase the pivoting angle or the displacement of the securing element 24 beyond the amount caused by the control contour 35. The control contour 35 pivots or displaces the securing element 24 until the oblique surfaces 36, 37 are in contact with one another, so that the securing element 24 is led off on the driver 10 and pivoted further out.

By contrast, in the secured position, planar surfaces are opposite one another, so that an unintended movement of the driver 10 (for example, in the event of a fracture of the thread) is reliably prevented.

List of Reference Symbols 1, 1' Locking device
2 Toothed ring
3 Housing
4 Electromechanical drive
5 Electric motor
6 Pinion
7 Gearwheel
8 Drive part
9 Threaded drive
10 Driver
11 Detent element
12 Guide
13 Longitudinal axis (driver)
14 Compression spring
15 Recess
16, 17 Blade-shaped segments, control contours
18 Internal thread
19 External thread, threaded segment
20 Shaft
22 Axis
23 Torsion spring, spring
24 Securing element, securing lever
25 Projection
26 Control cam
27 Magnetic-field sensor
28 Magnet
30, 31 Side parts
32 Cover
33 Lower part
34 Thrust plate
35 Control contour
36, 37 Oblique surfaces
100 Axis

What is claimed is:

1. Locking device with a detent element (11) axially displaceable by means of an electromechanical drive (4) from an unlocking position into a locking position, and vice versa, having the features:
   a) the locking device (1; 1') comprises a housing (3), in which are arranged a drive part (8) rotatable by means of the electromechanical drive (4) and an axially guided driver (10) comprising the detent element (11), the driver (10) and the drive part (8) being connected to one another via a threaded drive (9);
   b) the drive part (8) is axially displaceable counter to the pressure of a compression spring (14) supported on the housing (3), said drive part (8) comprising a control contour (16, 17) on an outer circumference;
   c) the locking device (1; 1') comprises a securing element (24) which is prestressed by a spring (23) and which, to secure the detent element (11) in the unlocking position, can be pressed by means of the spring (23) into a lateral recess or under a projection (25) of the driver (10) or of the detent element (11);
   d) the securing element (24) is connected to a control cam (26) which is at a distance from the securing element (24) which is selected in such a way that, with the detent element (11) in the unlocking position, the control cam (26) is located outside the range of action of the control contour (16, 17) arranged on the drive part (8), and
   e) the driver (10), the drive element (8) and the threaded drive (9) are designed in such a way and the position of the control contour (16, 17) on the drive part (8) is selected in such a way that, after the electromechanical drive (4) is activated in order to displace the detent element (11) into its locking position, with the driver (10) supported on the securing element (24), the drive part (8) is axially displaceable, counter to the pressure of the compression spring (14), in the direction of the control cam (26), until the control cam (26) comes into engagement with the control contour (16, 17), and, as a result of the pivoting of the control cam (26), the securing element (24) is moved out of the securing position, so that the drive part (8), together with the driver (10) and with the detent element (11), is displaced axially into the locking position by the compression spring (14).

2. Locking device according to claim 1, characterized in that the drive part (8) is an element of sleeve-shaped design at least in a part region, with an internal thread (18), and the driver (10) is a part which is mounted axially displaceably in a guide (12) fixed relative to the housing and which is provided, on a side facing the drive part (8), with an external thread (19) which, with the internal thread (18) of the drive part (8), forms the threaded drive (9).

3. Locking device according to claim 1, characterized in that the electromechanical drive (4) comprises an electric motor (5) which acts on a gearwheel (7) via a pinion (6), in that the gearwheel (7) has a recess (15), through which a part region, facing away from the driver (10), of the drive part (8) can be guided axially displaceably, and in that the recess (15) possesses an edge contour which engages positively into a corresponding contour of the part region of the drive part (8), so that the drive part (8) is connected fixedly in terms of rotation to the gearwheel (7).

4. Locking device according to claim 3, characterized in that the part region of the drive part (8) comprises two segments (16, 17) of blade-shaped design which are located opposite one another.

5. Locking device according to claim 4, characterized in that the blade-shaped segments (16, 17) are designed in such a way that they form the control contour of the drive part (8).

6. Locking device according to claim 1, characterized in that the driver (10) comprises a projection (25) for securing the detent element (11) in its unlocking position.

7. Locking device according to claim 1, characterized in that the control contour (16, 17) of the drive part (8) is designed in such a way that, during the upwardly directed displacement of the drive part (8), the control cam (26) is supported on a helical outwardly directed contact surface on the control contour (16, 17).

8. Locking device according to claim 1, characterized in that the control contour of the drive part (8) is of ramp-shaped design in the axial direction in such a way that the control cam executes its pivoting movement, necessary for releasing the securing element (24).

9. Locking device according to claim 1, characterized in that at least one sensor (27) is arranged in the housing (3) of the device (1') in order to monitor the position of the securing element (24).

10. Locking device according to claim 1, characterized in that the securing element (24) is a securing lever arranged on a shaft (20) fixedly in terms of rotation and is pivotable about an axis (22) parallel to the longitudinal axis (13) of the driver (10).

11. Locking device according to claim 1, characterized in that the securing element (24) and the control cam (26) are arranged in each case at the ends of a two-armed lever which is pivotable about an axis (100) running perpendicular to the longitudinal axis (13) of the driver (10).

* * * * *